(12) United States Patent
Sato et al.

(10) Patent No.: US 8,911,133 B2
(45) Date of Patent: Dec. 16, 2014

(54) PLANAR LIGHT SOURCE DEVICE AND ILLUMINATION APPARATUS

(75) Inventors: Eiichi Sato, Hachioji (JP); Kenji Fukuoka, Fussa (JP); Hiroyasu Sato, Hachioji (JP); Rihito Sato, Hachioji (JP)

(73) Assignee: Opto Design, Inc. (JP)

( * ) Notice: Subject to any disclaimer, the term of this patent is extended or adjusted under 35 U.S.C. 154(b) by 46 days.

(21) Appl. No.: 13/702,025

(22) PCT Filed: Jun. 8, 2011

(86) PCT No.: PCT/JP2011/063161
§ 371 (c)(1),
(2), (4) Date: Dec. 4, 2012

(87) PCT Pub. No.: WO2011/155537
PCT Pub. Date: Dec. 15, 2011

(65) Prior Publication Data
US 2013/0077345 A1 Mar. 28, 2013

(30) Foreign Application Priority Data
Jun. 8, 2010 (JP) .................................. 2010-131540

(51) Int. Cl.
*F21V 7/04* (2006.01)
*G02F 1/1335* (2006.01)
(Continued)

(52) U.S. Cl.
CPC ............ *F21V 7/0066* (2013.01); *G02F 1/1336* (2013.01); *G02F 1/133615* (2013.01);
(Continued)

(58) Field of Classification Search
CPC ............... G02B 6/0031; G02B 6/0055; G02F 1/133615; G02F 1/1335; F21V 7/00
USPC ........................................ 362/607, 609, 623
See application file for complete search history.

(56) References Cited

U.S. PATENT DOCUMENTS 6,474,826 B1 11/2002 Tanaka et al.
2006/0187528 A1* 8/2006 Hagood et al. ................ 359/298
(Continued)

FOREIGN PATENT DOCUMENTS

JP 8-153405 A 6/1996
JP 2001-236811 A 8/2001
(Continued)

OTHER PUBLICATIONS

Harison Toshiba Lighting Corp., Shomei-yo Chuku Unit, Japan Institute of Invention and Innovation, Journal of Technical Disclosure No. 2010-502040, (Apr. 2, 2010), 4 pgs.
(Continued)

*Primary Examiner* — William Carter
(74) *Attorney, Agent, or Firm* — Schwegman Lundberg & Woessner, P.A.

(57) ABSTRACT

To provide a planar light source device that can provide large-area, uniform, and high-quality planar illumination light.

A planar light source device includes a main body case 4 that surrounds the periphery of a gap between a pair of optical reflection plates disposed to face each other with side plates, and a plurality of point light sources 2 arranged at predetermined intervals on at least one side plate of the main body case. The planar light source device allows light from the point light sources 2 to be transmitted through at least one of the pair of optical reflection plates 5 and emitted to the outside. At least one 5 of the pair of optical reflection plates 5 includes a light blocking region S1 that blocks light from the point light sources on the point light sources 2 side, and a light transmission region S2 that does not allow the light from the point light sources 2 to be directly transmitted but allows reflection light reflected between the optical reflection plates to be transmitted, and is aligned so that transmissivity increases as the distance from the light blocking region S1 increases, and luminance is substantially uniform on the surface of the optical reflection plate.

10 Claims, 15 Drawing Sheets

(51) Int. Cl.
*F21V 11/14* (2006.01)
*F21V 8/00* (2006.01)
*F21V 7/00* (2006.01)
*F21K 99/00* (2010.01)
*F21Y 103/00* (2006.01)
*F21Y 105/00* (2006.01)
*F21Y 101/02* (2006.01)

(52) U.S. Cl.
CPC .... *G02F 1/133606* (2013.01); *F21Y 2103/003* (2013.01); *F21V 11/14* (2013.01); *G02B 6/0096* (2013.01); *F21Y 2105/00* (2013.01); *G02B 6/0061* (2013.01); *F21K 9/00* (2013.01); *F21Y 2101/02* (2013.01)
USPC ............................ 362/607; 362/609; 362/623

(56) References Cited

U.S. PATENT DOCUMENTS

2007/0165154 A1* 7/2007 Whitney et al. ................ 349/61
2007/0286562 A1* 12/2007 Inditsky ....................... 385/129
2011/0131849 A1 6/2011 Sato et al.

FOREIGN PATENT DOCUMENTS

| JP | 2005-099406 A | 4/2005 |
| JP | 2005-149848 A | 6/2005 |
| JP | 2010-62138 A | 3/2010 |
| WO | WO 2010/016528 A1 | 2/2010 |

OTHER PUBLICATIONS

"International Application Serial No. PCT/JP2011/063161, International Search Report mailed Aug. 23, 2011", (w/ English Translation), 4 pgs.

* cited by examiner

Fig.3
Fig. 3A
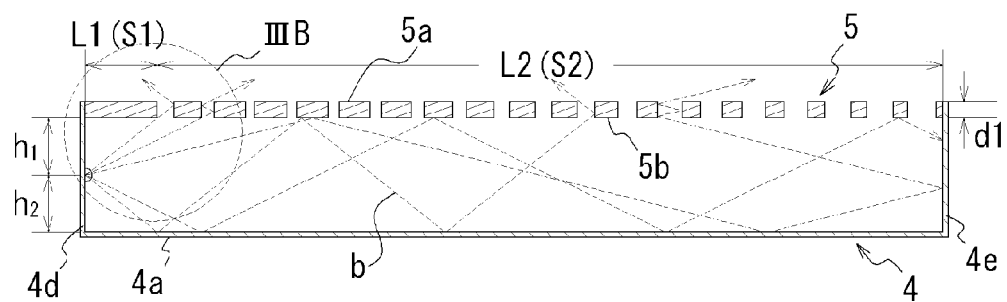
Fig. 3B
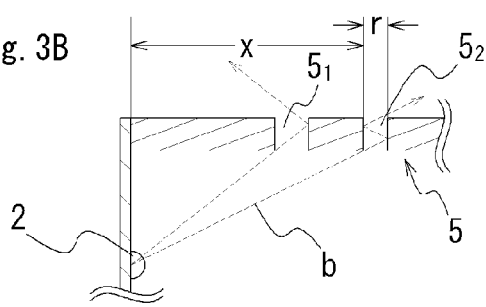

Fig.4
Fig. 4A
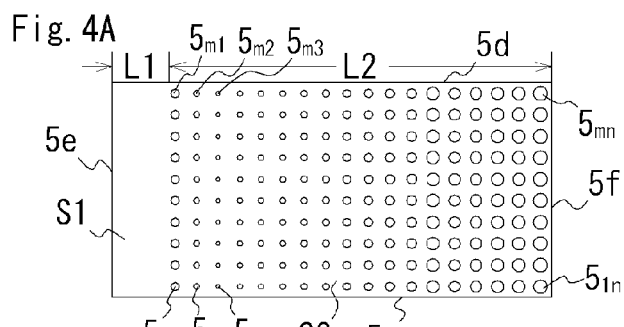
Fig. 4B
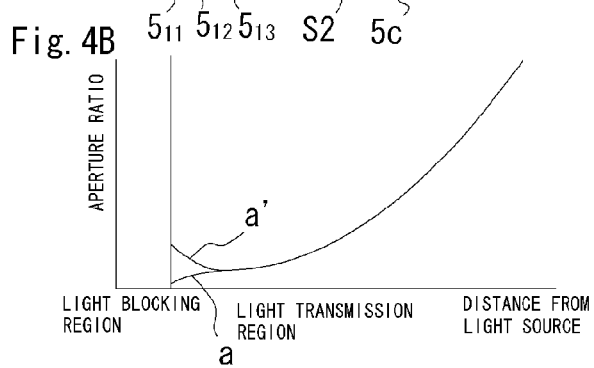
Fig. 4C
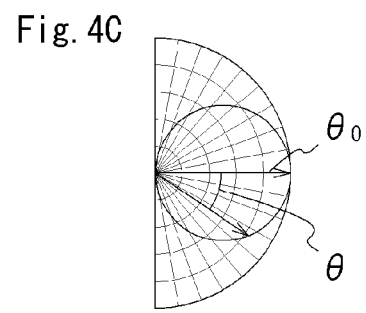
Fig. 4D
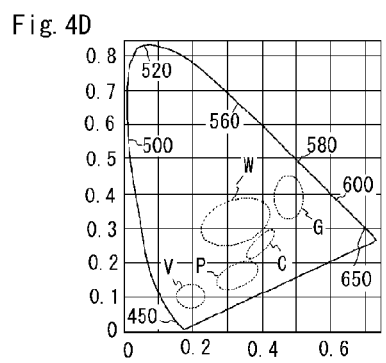

Fig.6
Fig. 6A
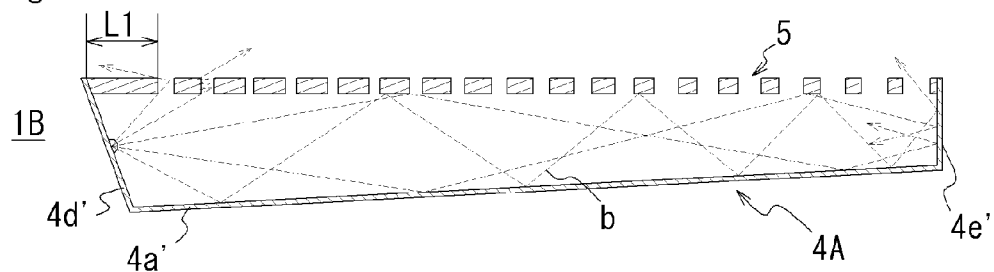
Fig. 6B
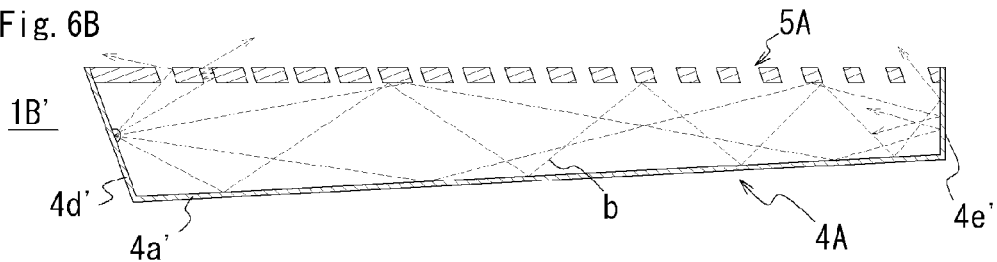

Fig.7
Fig. 7A
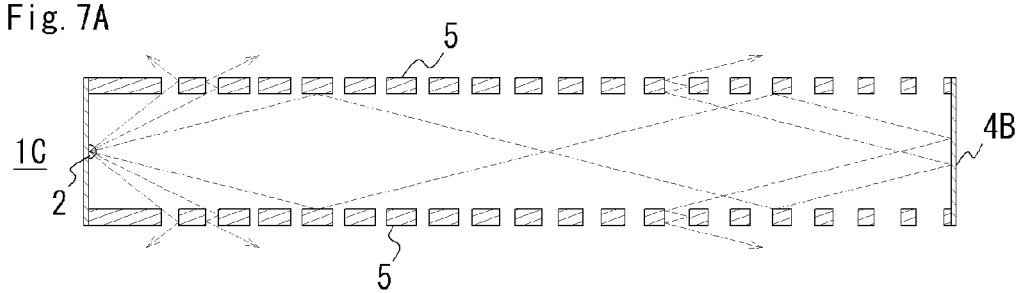
Fig. 7B
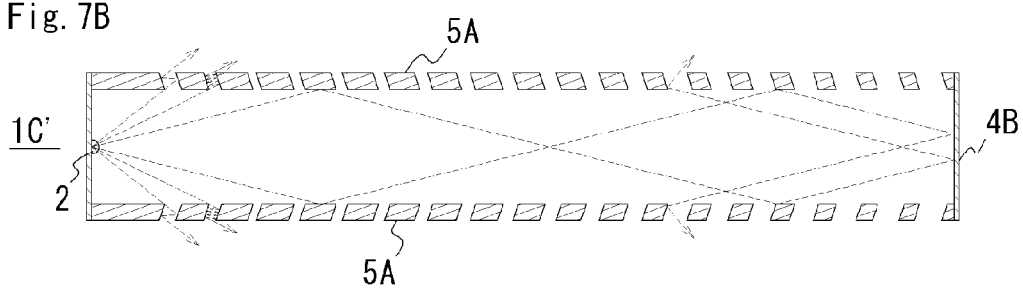

Fig.9
Fig. 9A
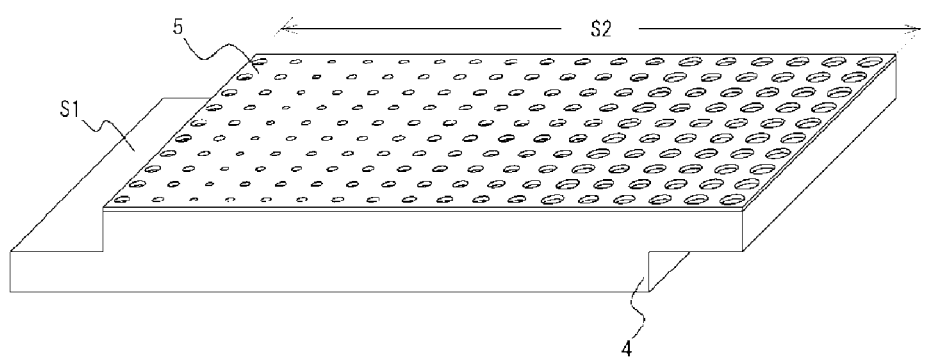
Fig. 9B
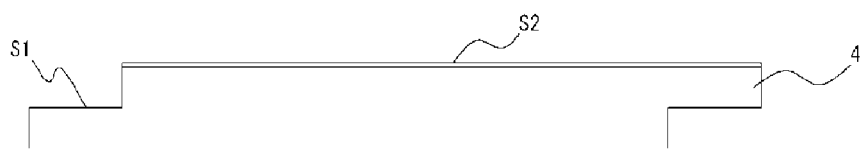

Fig.10
Fig. 10A
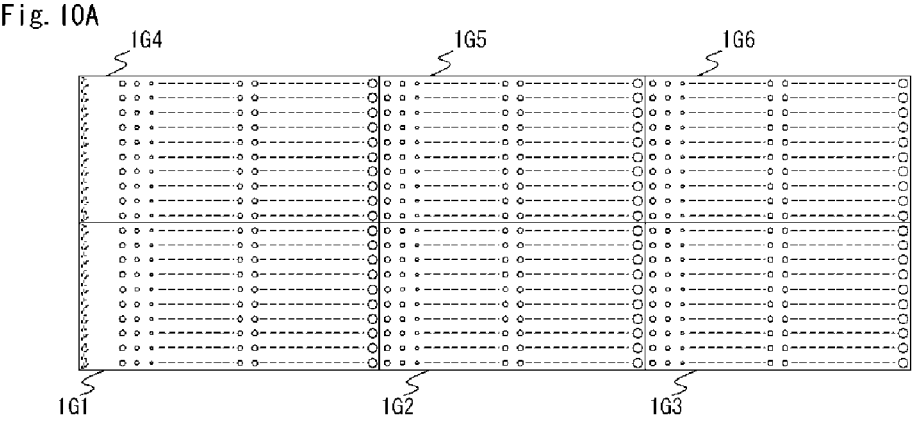
Fig. 10B
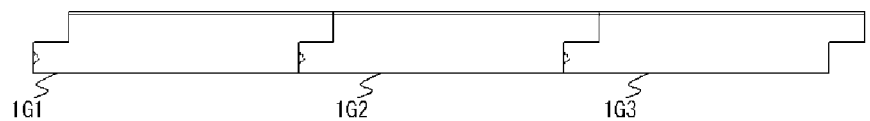

Fig.12
Fig. 12A
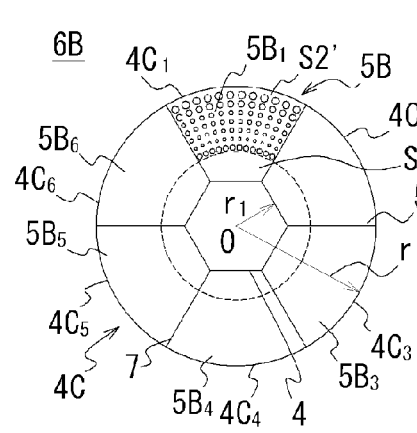
Fig. 12B
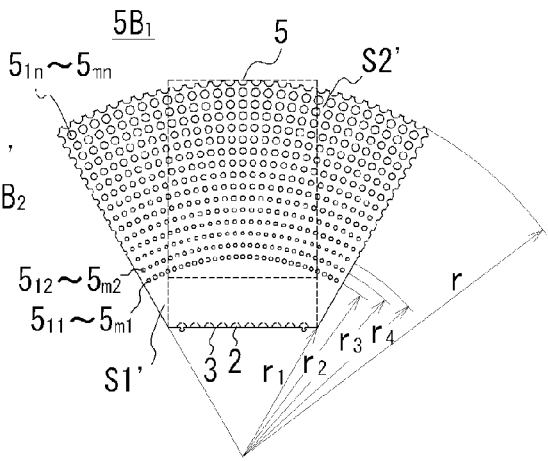

Fig.13
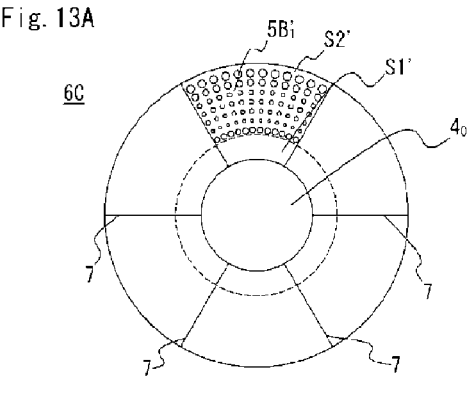
Fig. 13A
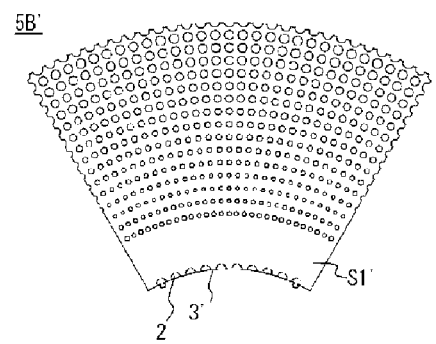
Fig. 13B

Fig.14
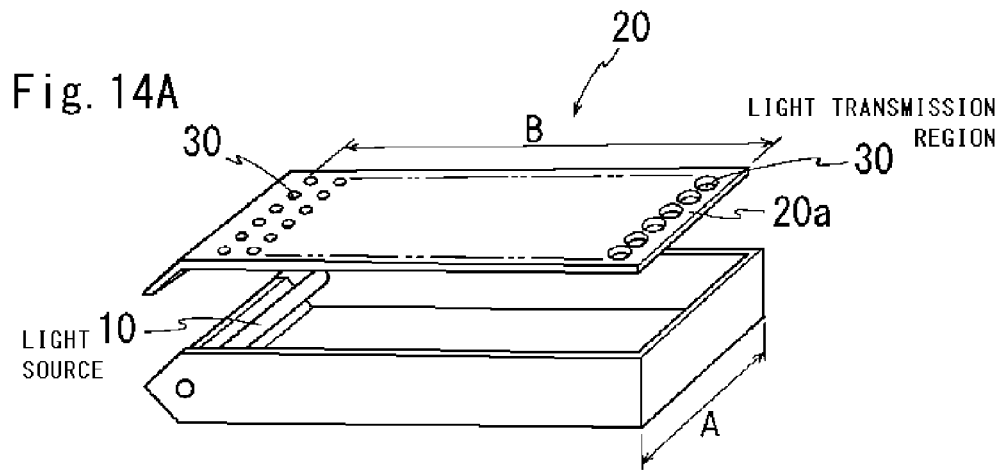
Fig. 14A
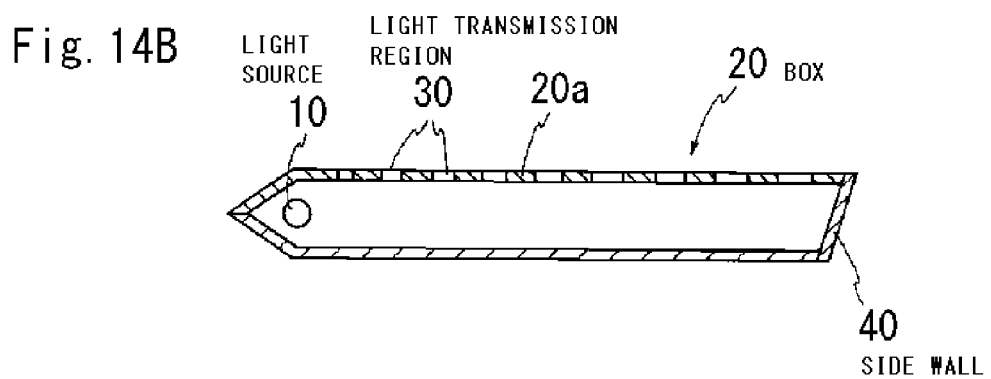
Fig. 14B

PLANAR LIGHT SOURCE DEVICE AND ILLUMINATION APPARATUS

RELATED APPLICATIONS

This application is a nationalization under 35 U.S.C. 371 of PCT/JP2011/063161, filed Jun. 8, 2011, and published as WO 2011/155537 A1 on Dec. 15, 2011, which claims priority to Japanese Patent Application Serial No. 2010-131540, filed Jun. 8, 2010, which applications and publication are incorporated herein by reference in their entirety.

TECHNICAL FIELD

The present invention relates to a planar light source device and an illumination apparatus, and more specifically to an edge lighting planar light source device using a point light source having strong directivity as a light source for emitting light from the point light source in the form of planar light, and an illumination apparatus using the planar light source device.

BACKGROUND ART

Planar illumination apparatuses are often used, for example, for backlights of liquid crystal panels. In general, planar illumination apparatuses of this type are mainly classified into: direct types in which a light source such as a fluorescent light is disposed immediately below a light diffusion plate formed of a plate-like body having a predetermined thickness and area, so that the light diffusion plate is directly irradiated by the light source and the light diffusion plate surface emits light; and edge lighting types in which a light source such as a fluorescent light or LED is disposed on at least one side of a light guide plate formed of a plate-like body having a predetermined thickness and area to allow the light guide plate surface to emit light.

Of these planar illumination apparatuses, the direct-type illumination apparatus is structured to have a prescribed gap, that is, a predetermined distance between the light source and the light diffusion plate. However, if this distance is reduced, the light diffusion plate reflects the outer shape of the light source, which makes visibility poor, resulting in degradation of illumination quality. If a point light source having strong directivity is used as the light source, the luminance becomes extremely high at the light diffusion plate immediately above the point light source, thereby causing a luminance difference with other illumination areas, and as a result, uniform illumination light cannot be obtained. One of the possible methods for solving these problems is to increase the distance between the light diffusion plate and the light source. However, this method causes new problems. For example, it is difficult to obtain illumination light having a desired illuminance because the whole area becomes darker as the distance increases, and it is impossible to reduce the thickness. Because of the problems above, it is difficult to adopt direct-type illumination apparatuses in some applications.

Therefore, the edge lighting illumination apparatuses have been used in place of such direct-type illumination apparatuses and proposed in many cases.

For example, Patent Document 1 below discloses an edge lighting illumination apparatus using a light emitting diode (hereinafter referred to as "LED") as a light source. This illumination apparatus includes an LED, a light guide plate having a light introduction portion formed on a flat surface, and a reflecting mirror that reflects light from the LED. The LED is mounted on the flat surface of the light guide plate and is covered with the reflecting mirror. The irradiation light from the LED is reflected by the reflecting mirror and introduced to the light guide plate. With this illumination apparatus, the irradiation light from the LED is efficiently taken into the light guide plate. Patent Document 2 below discloses an illumination apparatus configured to include a light source device having an LED and a light source rod, and a light guide plate for guiding irradiation light from the light source device. The light source rod is formed of a prism array having a predetermined shape. The light source rod allows the irradiation light from the LED to be emitted to a target through the light guide plate, thereby making luminance uniform. Patent Document 3 below discloses a cash register guide lamp in which a plurality of LEDs are arranged at regular intervals on a light entrance surface of a light guide body, light from these LEDs are irregularly reflected at a reflector, and the scattered light causes a light exit surface of the light guide body to emit planar light to illuminate a display body opposed to the light exit surface of the light guide body.

Patent Document 4 below discloses an edge lighting planar light source that emits planar illumination light, for example, using a linear light source. With reference to FIG. 14, the planar light source disclosed in Patent Document 4 will be described below. FIG. 14A is an exploded perspective view of a box that comprises the planar light source described in Patent Document 4, and FIG. 14B is a sectional view of FIG. 14A cut in the longitudinal direction. This planar light source includes a box 20 having an inner surface formed as a light reflecting surface, and a light source 10 contained in the box. A plurality of light transmission regions 30 are evenly provided on a top wall surface 20a that is one of the wall surfaces of the box. The proportion of these light transmission regions 30 to one wall surface increases as the distance from the light source increases. The light source light is emitted from the top wall surface 20a.

An example of this planar light source is described as follows. The box is formed of a metal plate coated with light reflecting metal film such as aluminum with a thickness of about 0.2 to 1.0 mm, and a light emission surface thereof approximately has length A×width B of 100 mm×100 mm and a depth of 5 mm. The light transmission regions 30 of the top wall surface include through holes having a diameter of about 0.4 mm at minimum to about 0.8 mm at maximum that are evenly provided at 1-mm pitches. A fluorescent light having a diameter of 3 mm and a length of 100 mm with luminance of 28,000 cd is used as the light source 10. This fluorescent light is arranged at one end portion of the box 20, and the top wall surface 20a seals the main body to prevent leakage of light. A light diffusion plate (not shown) made of polyethylene terephthalate (PET) or polycarbonate is provided on the top wall surface 20a. The light source includes a point light source such as a bulb, a halogen lamp, or a light emitting diode, a linear light source formed by arranging rod-like light sources such as fluorescent lights or point light sources for emitting light over an elongated extent, and a ring-shaped light source.

It is described that this planar light source achieves the effects as follows. In this planar light source, a light source is contained inside a box having an inner surface formed as a light reflecting surface, and light exits from the light transmission regions while being reflected by the inner surface in the interior space of the box. Therefore, light from the light source can be taken into the box completely without any loss. In addition, light absorption in the space is very small, and light from the light source is taken out from the light transmission regions almost completely and contributes as the planar light source without loss produced when light is taken into a conventional light guide plate or light absorption loss due to passage through the light guide plate. Thus, the light use efficiency is greatly improved. The proportion of the light transmission regions is small with respect to the wall surface from which light is taken out in the proximity to the light source, whereas the proportion becomes larger as the distance from the light source increases. Therefore, at a location close to the light source and with a large quantity of light, light is emitted from a part where the proportion of the light transmission regions is small, whereas at a location distant from the light source and with a small quantity of light, light is emitted from a part where the proportion of light transmission regions is large. As a result, light with uniform luminance is emitted from the surface.

PATENT DOCUMENTS

[Patent Document 1] JP-A-2005-149848 (paragraph [0012], FIG. 1)

[Patent Document 2] JP-A-2001-236811 (paragraphs [0011] to [0014], FIG. 1)

[Patent Document 3] JP-A-2005-99406 (paragraph [0016], FIG. 3)

[Patent Document 4] JP-A-8-153405 (paragraph [0034], FIG. 1)

DISCLOSURE OF INVENTION

Problem to be Solved by the Invention

In the illumination apparatuses in Patent Documents 1 to 3 above, all of which use a light guide plate, a large guide plate is required in proportion to the light emission area when the light emission area is increased. However, the weight of the large guide plate is increased accordingly because a thick glass plate or plastic plate is usually used as the light guide plate. The illumination apparatus including such a guide plate increases in weight and price. In addition, when such a large light guide plate is used, a light path from the light source to the light emission surface becomes long, and attenuation of light increases accordingly, making it difficult to obtain uniform illumination light and to obtain illumination light having high illuminance as well. Although the illumination apparatus in Patent Document 2 above uses a light source rod having a special shape, it is difficult to increase the size even using such a light source rod. Therefore, the illumination apparatus using the light guide plate is suitable for small-size applications but has its limits in size increase.

In the planar light source as seen in Patent Document 4 above, the outer shape of a fluorescent light serving as a linear light source may be reflected by the light diffusion plate to make a shadow. FIG. 15 schematically shows a light path from the light source in such a planar light source. In the planar light source of this type, light from the linear light source directly passes through a light transmission region, that is, an opening. This direct light causes an image 50*a* of the linear light source, for example, a fluorescent light to be reflected on the light diffusion plate 50. In other words, due to the so-called pinhole photography phenomenon, an image of the linear light source is reflected on the light diffusion plate 50. According to Patent Document 4, the linear light source includes a linear arrangement of point light sources in addition to a fluorescent light. However, even with such a linear light source, direct light causes an image of the light source to be reflected in a similar manner as in a fluorescent light. In the case where LEDs are used as point light sources and are arranged linearly to serve as a linear light source, the color characteristics of the LEDs are intrinsically irregular, and it is very difficult to obtain LEDs having the same color characteristic. As a result, the LEDs inevitably have irregular color characteristics, so that the illumination color light may vary, and the illumination quality may be degraded. Furthermore, the LED light is directly transmitted through the through holes of the light transmission regions, so that the LED light having strong directivity is emitted to the outside, causing dazzling and uncomfortable glare.

In view of the above-mentioned problems, the present invention provides an edge lighting planar light source device and illumination apparatus that can provide large-area, uniform, and high-quality planar illumination light without the need for a light guide plate, which is essential in related arts, even when a point light source having strong directivity is used as a light source.

According to another aspect, the invention provides an edge lighting planar light source device and illumination apparatus that is lightweight and inexpensive, and can illuminate both sides or one side, that is, provide uniform and high-quality planar illumination light with a large area on either side in single-sided illumination or double-sided illumination.

According to yet another aspect, the invention provides an illumination apparatus in which a plurality of planar light source devices according to another aspect above are joined to provide high-quality illumination light.

Means for Solving Problem

A planar light source device according to the invention includes a main body case that surrounds the periphery of a gap between a pair of optical reflection plates disposed to face each other with side plates, and a plurality of point light sources arranged at predetermined intervals on at least one side plate of the main body case. The planar light source device allows light from the point light sources to be transmitted through at least one of the pair of optical reflection plates and emitted to the outside. At least one of the pair of optical reflection plates includes a light blocking region that blocks light from the point light sources on the point light sources side, and a light transmission region that does not allow the light from the point light sources to be directly transmitted but allows reflection light reflected between the optical reflection plates to be transmitted, and is aligned so that transmissivity increases as the distance from the light blocking region increases, and luminance is substantially uniform on the surface of the optical reflection plate.

In the planar light source device of the invention, it is preferable that the light transmission region be aligned so that luminance is uniform on the surface of the optical transmission region based on light distribution characteristics of the point light sources.

In the planar light source device of the invention, it is preferable that the light transmission region have a plurality of through holes or slits disposed to pass through the optical reflection plate.

In the planar light source device of the invention, it is preferable that the light blocking region be formed in a region wider than the gap between the pair of optical reflection plates.

In the planar light source device of the invention, it is preferable that the light blocking region and the light transmission region be separated from each other, and that the distance from the light blocking region to the optical reflection plate opposed thereto be half the distance from the light transmission region to the optical reflection plate opposed to the light transmission region.

According to the invention, a planar light source device includes a main body case having a through hole at the center of a disk-like body with a predetermined depth, the disk-like body being is shallow and is open at the surface opposed to the bottom, an optical reflection plate that closes the opening of the main body case, and a point light source disposed on a wall surface of the through hole of the main body case. The planar light source device allows light from the point light source to be reflected between an inner wall surface of the main body case and the optical reflection plate to be emitted to the outside. The optical reflection plate includes a light blocking region that blocks the light from the point light source on the point light source side, and a light transmission region that does not allow the light from the point light source to be directly transmitted but allows reflection light reflected between the optical reflection plates to be transmitted, and is aligned so that transmissivity increases as the distance from the light blocking region increases and luminance is substantially uniform on the surface of the optical reflection plate.

In the planar light source device of the invention, it is preferable that the optical reflection plate have the light blocking region around the periphery of the through hole of the main body case and the light transmission region around the periphery of the light blocking region.

In the planar light source device of the invention, it is preferable that the light transmission region be aligned based on light distribution characteristics of the point light source so that luminance is uniform on the surface of the light transmission region.

In the planar light source device of the invention, it is preferable that the light transmission region include a plurality of through holes or slits passing through the optical reflection plate that are disposed concentrically about the through hole.

An illumination apparatus according to the invention includes at least one planar light source device as described above.

An illumination apparatus according to the invention includes at least one planar light source device as described above and a light diffusion plate on an illumination surface thereof.

Advantages of the Invention

The invention provides an edge lighting planar light source device that: does not require a light guide plate essential in related arts even when a point light source with strong directivity is used as a light source; is lightweight and inexpensive; can illuminate both sides or one side, that is, illuminate a wide range on each side in single-sided illumination or double-sided illumination; and can provide high-quality planar illumination light with uniform illuminance. In particular, even when the characteristics vary among a plurality of point light sources, the light blocking region hides the region where the illumination color or illuminance significantly varies, thereby preventing degradation of illumination quality. Furthermore, uncomfortable glare does not occur because light from the point light source is not directly transmitted. In addition, even when a light diffusion plate is disposed above the surface of the optical reflection plate, an image of the point light source is not formed.

The invention also provides a disk-shaped planar light source device that: does not require a light guide plate essential in related arts even when a point light source with strong directivity is used as a light source; is lightweight and inexpensive; can illuminate a wide range; and can provide high-quality planar illumination light with uniform illuminance. In particular, even when the characteristics vary among a plurality of point light sources, the light blocking region hides the region where the illumination color or illuminance significantly varies, thereby preventing degradation of illumination quality. Furthermore, uncomfortable glare does not occur because light from the point light source is not directly transmitted. In addition, even when a light diffusion plate is disposed above the surface of the optical reflection plate, an image of the point light source is not formed.

The invention further provides an illumination apparatus that: does not require a light guide plate essential in related art even when a point light source with strong directivity is used as a light source; is lightweight and inexpensive; and can provide large-area, uniform, and high-quality planar illumination light.

BRIEF DESCRIPTION OF THE DRAWINGS

FIG. 3A is a sectional view taken along a line IIIA-IIIA in FIG. 1, and FIG. 3B is an enlarged view of a portion IIIB in FIG. 3A.

FIG. 4 shows an optical reflection plate included in the planar light source device in FIG. 1, where FIG. 4A is a plan view of the optical reflection plate, FIG. 4B is a curve graph showing the relation between the distance from the light source and the aperture ratio, FIG. 4C shows a general light distribution curve of an LED, and FIG. 4D shows general color characteristics of an LED.

FIG. 5A is a longitudinal sectional view corresponding to FIG. 3A, and FIG. 5B is an enlarged sectional view of VB in FIG. 5A.

FIG. 6 shows another modification of the planar light source device in FIG. 1, where FIG. 6A is a longitudinal sectional view corresponding to FIG. 3A, and FIG. 6B is a sectional view of a modification of FIG. 6A.

FIG. 7A is a longitudinal sectional view corresponding to FIG. 3A of the planar light source device according to another embodiment of the invention, and FIG. 7B is a sectional view corresponding to FIG. 3A of a modification of the planar light source device in FIG. 7A.

FIG. 9A is a perspective view of a planar light source device according to a modification of the invention, and FIG. 9B is a side view of the planar light source device according to the modification of the invention.

FIG. 10A is a top view of a large planar light source device having a plurality of planar light source devices coupled to each other according to a modification of the invention, FIG. 10B is a side view of the large planar light source device having a plurality of planar light source devices coupled to each other according to the modification of the invention.

FIG. 12 shows the planar light source device in FIG. 11A, where FIG. 12A is a top view, and FIG. 12B is a plan view showing an optical reflection plate in FIG. 12A partially enlarged.

FIG. 13 shows a modification of the planar light source device in FIG. 12, where FIG. 13A is a top view, and FIG. 13B is a plan view showing an optical reflection plate in FIG. 12A partially enlarged.

FIG. 14 shows a planar light source of a related art, where FIG. 14A is an exploded perspective view, and FIG. 14B is a sectional view of FIG. 14A cut in a longitudinal direction.

BEST MODES FOR CARRYING OUT THE INVENTION

Embodiments of the invention will be described below with reference to the drawings. It is noted that the embodiments shown below only illustrate a planar light source device and an illumination apparatus using the planar light source device for embodying the technical idea of the invention and are not intended to limit the invention thereto, and other embodiments that fall within the scope of the claims are also equally applicable.

Figure 1:
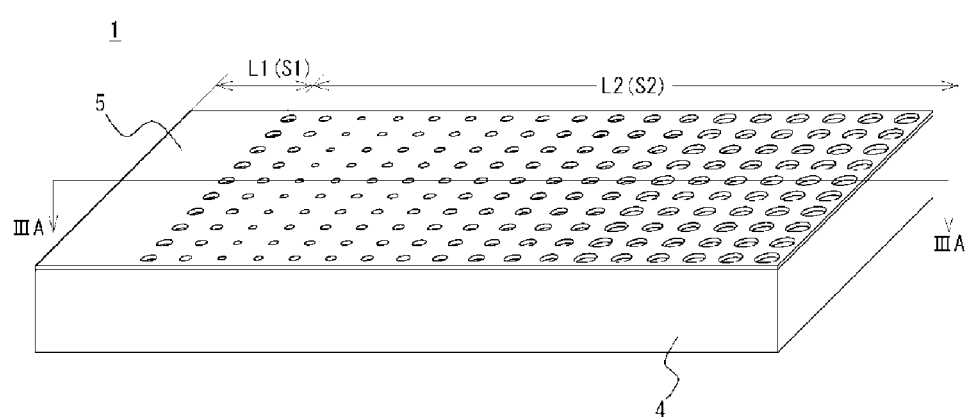
FIG. 1 is an external perspective view of a planar light source device according to an embodiment of the invention.
Figure 2:
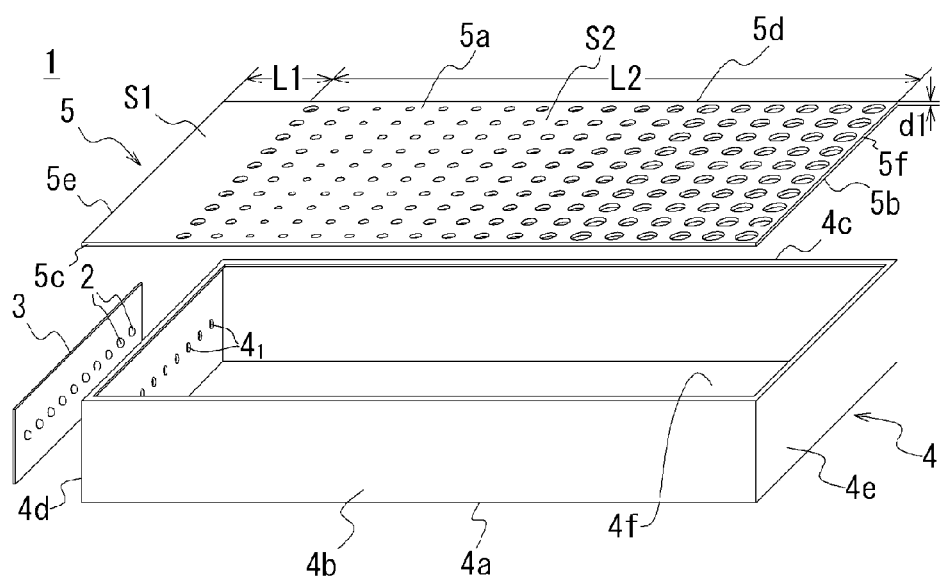
FIG. 2 is an exploded perspective view of the planar light source device in FIG. 1.

With reference to FIG. 1 to FIG. 4, a planar light source device according to an embodiment of the invention will be described. FIG. 1 is an external perspective view of a planar light source device according to an embodiment of the invention. FIG. 2 is an exploded perspective view of the planar light source device in FIG. 1. FIG. 3A is a sectional view taken along line IIIA-IIIA in FIG. 1, and FIG. 3B is an enlarged view of a portion IIIB in FIG. 3A. FIG. 4 shows an optical reflection plate included in the planar light source device in FIG. 1, where FIG. 4A is a plan view of the optical reflection plate, FIG. 4B is a curve graph showing the relation between the distance from the light source and the aperture ratio, FIG. 4C shows a general light distribution curve of an LED, and FIG. 4D shows general color characteristics of an LED.

A planar light source device 1 according to an embodiment of the invention includes, as shown in FIGS. 1 and 2, a plurality of light sources having strong directivity, for example, LEDs 2, an LED substrate 3 on which these LEDs 2 are arranged at predetermined intervals, a main body case 4 having a side wall surface to which the LED substrate 3 is attached and having an opening 4f upward, and an optical reflection plate 5 that serves as a cover body covering the opening 4f of the main body case 4 and emits light from the LEDs 2 approximately uniformly. This planar light source device 1 is edge lighting. The planar light source device 1 is used as it is or used with a light diffusion plate (not shown) disposed at a predetermined distance away from the surface of the optical reflection plate 5 for an illumination apparatus, a display apparatus, etc. The light diffusion plate is formed of a plate-like body of polyethylene terephthalate (PET), polycarbonate, or similar material, and such a plate-like body is disposed at a predetermined distance, for example, about 3 mm to 100 mm away from the optical reflection plate. The individual components will be described below.

The LEDs 2 used include a single light emitting element or a group of a plurality of elements with any emission light color. For use in an illumination apparatus, LEDs emitting white light are preferred. Of course, LEDs emitting light of other colors, for example, three primary colors, namely, red, blue, and green may be used. Laser diodes or the like may be used in place of LEDs.

As shown in FIG. 2, the LED substrate 3 is formed of a substrate having approximately the same size as a side plate portion 4d of the main body case 4, for example, a heat dissipating substrate subjected to insulation treatment. A plurality of LEDs are disposed approximately in a row (array) at predetermined intervals on the substrate. A plurality of LED rows in this manner may be provided at predetermined intervals on this LED substrate. The use of a plurality of LEDs can increase illuminance.

As shown in FIG. 2, the main body case 4 is formed of a shallow box-shaped body including a bottom plate portion 4a in an approximately rectangular shape having opposing long sides and short sides with a predetermined area, side plate portions 4b, 4c, 4d, and 4e upright from the bottom plate portion by a predetermined height, and the opening 4f open at the top of each side plate portion. An inner wall surface of the main body case 4 is formed of a reflecting surface with high reflectance. The main body case 4 is configured by cutting and folding a reflective plate material or by cutting and processing a non-reflective plate material into a box and coating the inner wall surface of the box with reflective material. The former reflective plate material used is preferably an ultrafinely foamed reflection plate (trade name: MCPET). The latter coating used is preferably emulsified particulates of titanium white, particulates of polytetrafluoroethylene (poly fluoro carbon) (trade name: G-80Halon), or similar material.

The main body case 4 is of any size. In this embodiment, the height $(h_1+h_2)$ of the main body case 4 is 15 mm, the length of the short side is 110 mm, and the length of the long side is 180 mm. A thickness d1 is 1.0 mm (see FIG. 3A). The main body case 4 has through holes $4_1$ on one side plate portion 4d so that light emitting portions of the LEDs 2 fixed to the LED substrate 3 are exposed to the inside of the main body case 4. The LED substrate 3 is attached to the side plate portion 4d using known fixing means.

As shown in FIG. 2 to FIG. 4, the optical reflection plate 5 has front and back surfaces 5a and 5b, opposing long sides and short sides 5c, 5d, 5e, and 5f, and a predetermined thickness d1, and is formed of a reflective plate with such a size that allows the optical reflection plate 5 to close the opening 4f of the main body case. The front and back surfaces 5a and 5b serve as reflecting surfaces with high reflectance. Of the front and back surfaces, the back surface 5b serves as a reflecting surface, and the front surface 5a serves as a reflecting surface and a surface emitting illumination light at the same time. The optical reflection plate 5 is preferably produced with an ultrafinely foamed reflection plate (trade name: MCPET). Of course, the invention is not limited to this material.

The optical reflection plate 5 is attached to the opening 4f of the main body case such that one short side 5e is located on the side facing the LEDs 2 and the other short side 5f is located on the side distant from the LEDs 2. The optical reflection plate 5 is partitioned, from one short side 5e to the other short side 5f, into a light blocking region S1 that blocks light from the LEDs 2, and a light transmission region S2 through which light is transmitted at a predetermined ratio in accordance with the distance from the light blocking region S1. The light blocking region S1 is a rectangular region having a predetermined area set in a range from the short side 5e at a predetermined distance L1. This light blocking region S1 is formed in a rectangular shape adapted to the arrangement of a plurality of LEDs 2, that is, the linear arrangement of LEDs. The size of the light blocking region S1 is determined in consideration of the characteristics of the LEDs (light distribution and color characteristics) in the following (i) to (iv) as well as through holes provided in the light transmission region S2.

(i) LED Element

An LED generally has a light emitting element portion provided with fluorescent material. Therefore, when an LED is brought closer to an optical reflection plate for the purpose of thickness reduction, the color of the fluorescent material of the LED, for example, yellow, may be reflected on the optical reflection plate. For this reason, the LED cannot be brought closer to the optical reflection plate. If the LED is brought closer toward the optical reflection plate on purpose for thickness reduction, the portion of the optical reflection plate to which the LED is brought closer reflects an abnormal color and makes visibility poor, resulting in degradation of illumination quality.

(ii) LED Light Distribution Curve

The LED used in the present embodiment has different light intensities depending on directivity angles θ, as shown in FIG. 4C. Specifically, the LED has the light distribution characteristic such that the light intensity is the highest at a directivity angle of zero degrees $\theta_0$, the light intensity decreases as the angle increases, and is the lowest at 90°. Accordingly, this light distribution characteristic of the LED makes the illuminance near the LED smaller and darker.

(iii) Color Characteristics of LED

When a plurality of LEDs are used, it is very difficult to obtain those having the same color characteristic since the respective color characteristics of the LEDs are subtly different from each other. If the color characteristics of individual LEDs are different, illumination light rays emitted onto the optical reflection plate near the LED are subtly different and yield illumination light without a desired color, thereby giving discomfort and leading to a reduction of illumination quality. The color characteristics of LEDs will be additionally explained below.

An LED has the color characteristic as shown by the chromaticity diagram in FIG. 4D. In this chromaticity diagram, for example, a region W is a region of white light, which is not a spot region having a small unit area but is divided into a plurality of regions named as, for example, a cool hot white region, a neutral white region, and a warm white region. Each of these regions is also subdivided into a plurality of small regions. Each subdivided small region is also called a bin. The division of these bins is determined by the suppliers manufacturing LEDs, is not shared among suppliers, and is not yet standardized.

In the case where an apparatus manufacturer using LEDs requires LEDs of a predetermined color in a particular bin, for example, white light, a supplier manufactures LEDs in this bin. However, with the LED technique at present, the characteristics of manufactured LED products vary depending on manufacturing conditions including material thereof, manufacturing facility, manufacturing environment, and production lots, and often deviate from the targeted particular bin. In addition, even the LED products manufactured under the same conditions inevitably vary in characteristics.

The supplier inspects the characteristics of the manufactured LED products one by one and screens them for the bin having a predetermined characteristic on the basis of the inspection result. The division of individual bins is determined by each supplier and is not standardized. Therefore, an apparatus manufacturer has difficulty in obtaining LED products having the same characteristic even from the same supplier and, if obtaining LED products from a different supplier, cannot match the bins due to the lack of standardization of bins. Therefore, even when the same white light LEDs are used, different emission light colors, for example, bluish white from some LEDs and yellowish white from the other LEDs, are obtained since there are differences even in the same bin from the same supplier, and the bin from a different supplier cannot be matched. Thus, a color other than white is slightly mixed in, and illumination of the desired white light cannot be obtained. The same phenomenon occurs in illumination light other than white light.

(iv) Through Hole Provided in Light Transmission Region S2

A through hole having a predetermined size is provided in the light transmission region S2 as described later. When emission light from an LED is directly transmitted (passed) through this through hole, the same problem as that of the related arts arises. Specifically, a through hole is provided to satisfy a relation of $x/h_1 > r/d1$, where x is a vertical distance from the light source to the through hole and r is the diameter of the through hole. This direct light appears more easily as the distance from the light source decreases. Thus, the light blocking region S1 that blocks light by a predetermined distance L1 is required in consideration of the light distribution of the light source, the distance from the light source to the optical reflection plate, and other factors.

In this embodiment, in consideration of (i) to (iv) above, the distance L1 of the light blocking region S1 is set at 40.0 mm. The distance L1 is set in a prototype test and is twice or more than twice as large as the height $(h_1 + h_2)$ of the main body case 4 of 15 mm. As a result of a prototype test of the main body cases with different sizes, it was confirmed that the inconvenience as described in (i) to (iv) above can be mostly eliminated by setting the distance L1 twice or more than twice as large as the height. It is preferable that semi-through holes or grooves not passing through the reflection plate be provided in proximity to the border with the light transmission region S2 because increasing the area of the light blocking region S1 limits the illumination area to a narrow range. The semi-through holes or grooves are provided at predetermined intervals approximately in parallel with the short side 5e.

As shown in FIG. 4A, the light transmission region S2 has holes each having an opening of a predetermined size that pass through the optical reflection plate at intersections of horizontal virtual lines (not shown) drawn in parallel at predetermined intervals from one long side 5c to the other long side 5d and vertical virtual lines (not shown) drawn in parallel at predetermined intervals from one short side 5e to the other short side 5f over the light blocking region S1. More specifically, a plurality of through holes $5_{11}$ to $5_{1n}, \ldots, 5_{m1}$ to $5_{mn}$ with different opening areas are formed on the horizontal virtual lines, and a plurality of through holes $5_{11}$ to $5_{m1}, \ldots 5_{1n}$ to $5_{mn}$ with the same opening area are formed on the vertical virtual line. The arrangement of a plurality of through holes $5_{11}$ to $5_{1n}, \ldots, 5_{m1}$ to $5_{mn}$ forms a through hole row, and the arrangement of through holes $5_{11}$ to $5_{m1}, \ldots, 5_{1n}$ to $5_{mn}$ forms a through hole column, similarly. These through holes are sized such that emission light from the LEDs 2 cannot be directly passed, and the opening areas of the through holes $5_{11}$ to $5_{1n}, \ldots, 5_{m1}$ to $5_{mn}$ increase as the distance from the light blocking region S1 increases.

In other words, light from the LEDs 2 is reflected between the inner wall surface of the main body case 4 and the back surface 5b of the optical reflection plate 5, and thereafter emitted to the outside through the through holes. For example, in the through holes $5_1$ and $5_2$ close to the light blocking region S1, as shown in FIG. 3B, a light ray b from the LED 2 does not directly pass through the through holes $5_1$ and $5_2$ but is reflected between the inner wall surface of the main body case 4 and the back surface 5b of the optical reflection plate 5, and emitted to the outside after being reflected at least once even in these through holes. In other through holes, light is emitted to the outside after being reflected at least once. The opening areas of the through holes $5_{11}$ to $5_{m1}, \ldots, 5_{mn}$ to $5_{mn}$ increase as the distance from the light blocking region S1 increases, where the relation between these opening areas, that is, the aperture ratio and the distance is represented approximately by a quadric curve as shown in FIG. 4B.

In the light transmission region S2, the region close to the light blocking region S1 has low light intensity and is darker because of the large directivity angle for the reason (ii) above. Thus, the through holes in the region close to the light blocking region S1, for example, the through hole columns $5_{11}$ to $5_{m1}$ and $5_{12}$ to $5_{m2}$ have opening areas slightly larger than the through holes columns $5_{13}$ to $5_{m3}$ adjacent thereto. The relation between the aperture ratio and the distance of the optical reflection plate is represented by a curve a' in FIG. 4B. In this embodiment, in the through hole column $5_{11}$ to $5_{m1}$ closest to the light blocking region S1, the diameter of the opening is 3.00 mm and the interval between the openings is 5.00 mm. In the next through hole column $5_{12}$ to $5_{m2}$, the diameter is set smaller than 3.00 mm, and then in the next through hole column $5_{13}$ to $5_{m3}$, the opening is the smallest with a diameter of 1.5 mm. In the furthest through hole column $5_{1n}$ to $5_{mn}$, the diameter of the opening is set at 3.8 mm.

The optical reflection plate has circular through holes having predetermined opening areas in the light transmission region S2. However, slots having predetermined areas, that is, slits may be used in place of the through holes. The slits are arranged approximately parallel with the light blocking region S1. In place of the through holes or slits, a light blocking film having openings at places corresponding to the through holes or slits may be provided on a transparent substrate.

In assembly of the planar light source device 1, the LED substrate 3 having the LEDs 2 disposed thereon is attached to one side wall surface of the main body case 4, and the opening 4f is covered with the optical reflection plate 5. The assembly is thus completed. Although not shown, a light diffusion plate is disposed, if necessary, at a predetermined distance above the optical reflection plate.

The assembled planar light source device 1 is formed such that light from the LED 2 is reflected at least once between the inner wall surface of the main body case 4 and the back reflecting surface of the optical reflection plate 5 and thereafter transmitted through the light transmission region S2 of the optical reflection plate 5 to the outside from the irradiation surface. In other words, the light is not transmitted through the light blocking region S1 but is reflected at least once, that is, multiply reflected and distributed to be emitted from the light transmission region S2. The planar light source device 1 has the optical reflection plate 5 including the light blocking region S1 having a predetermined area in, so that even when a plurality of LEDs 2 vary in color, etc., this color variation does not appear on the irradiation surface of the optical reflection plate 5, thereby preventing degradation of illumination quality. In addition, direct light from the LEDs 2 does not exit from the optical reflection plate 5, so that even when the optical reflection plate 5 is brought closer to the LEDs 2, the LEDs are not reflected on the irradiation surface of the optical reflection plate 5, which enables reduction in thickness. Furthermore, in the light transmission region S2, the opening areas of the through holes in the region adjacent to the light blocking region S1 are increased in relation to the light distribution characteristic of the LEDs, thereby preventing this region from being darkened. Thus, almost uniform illumination light can be emitted as a whole.

In the case of disposing a light diffusion plate, the light diffusion plate has a region corresponding to the light blocking region S1 as a similar light blocking region. In a region corresponding to the light transmission region S2, irradiation light passed through the optical reflection plate is multiply reflected between the irradiation surface of the optical reflection plate and the back surface of the light diffusion plate to be emitted from the irradiation surface of the light diffusion plate.

Figure 5:
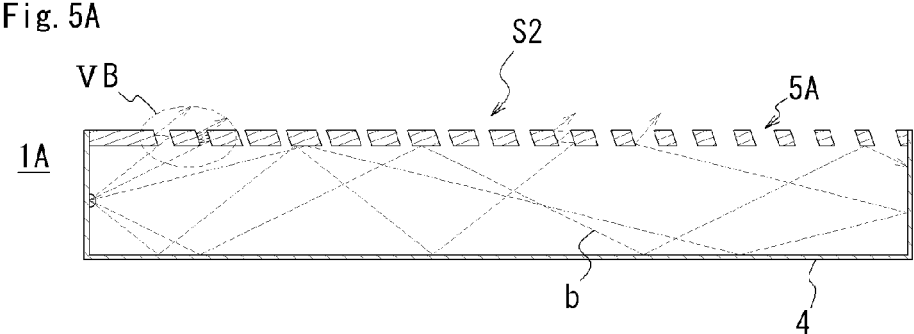
FIG. 5 shows a modification of the planar light source device in FIG. 1, where
Figure 5:
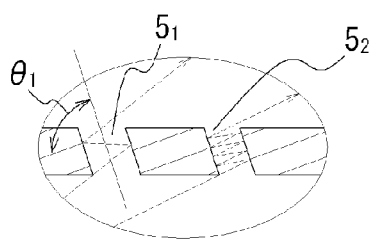

Although the main body case 4 and the optical reflection plate 5 having the shape as described above are used in the planar light source device 1, they may be modified. A planar light source device 1A in FIG. 5A uses an optical reflection plate 5A in place of the optical reflection plate 5. In this optical reflection plate 5A, the through hole in the light transmission region S2 is an inclined hole that is inclined at a predetermined angle $\theta_1$ toward the upper left relative to the horizontal direction (see FIG. 5B). This inclination angle $\theta_1$ is in a range from 30° to less than 90°, preferably, larger than 45° and about 80°, although this depends on the thickness of the optical reflection plate 5A. The planar light source device 1A using this optical reflection plate 5A allows direct light from the LEDs 2 to be less transmitted than that of the planar light source device 1.

A planar light source device 1B in FIG. 6A uses a main body case 4A in place of the main body case 4. The main body case 4A is configured such that a side plate portion 4d' having the LEDs 2 disposed thereon is inclined at a predetermined angle toward the upper left relative to the horizontal direction, and a bottom plate portion 4a' is inclined at a predetermined angle toward the upper right from one side plate portion 4d' to the other side plate portion 4e'.

A planar light source device 1B' in FIG. 6B uses the optical reflection plate 5A in place of the optical reflection plate 5 in FIG. 6A. In the planar light source devices 1B and 1B', the optical reflection plates 5 and 5A form an acute angle with the side plate portion 4d' of the main body case having the LEDs mounted thereon. Because of this configuration, the thickness can be reduced, and the distance of the light blocking region S1 can be reduced when compared with the planar light source devices 1 and 1A.

The planar light source devices 1 to 1B' are so-called single-sided light source device in which an optical reflection plate is mounted on the opening of the main body case, and light from LEDs 2 is emitted from the surface of the optical reflection plate. However, a double-sided light source device, which allows irradiation additionally from the other surface, may be configured.

A planar light source device 1C in FIG. 7A uses a main body case 4B having an opening additionally at the bottom plate portion of the main body case 4 and has the optical reflection plates 5 attached to both openings. A planar light source device 1C' in FIG. 7B has the optical reflection plates 5A attached to the main body case 4B.

Figure 8:
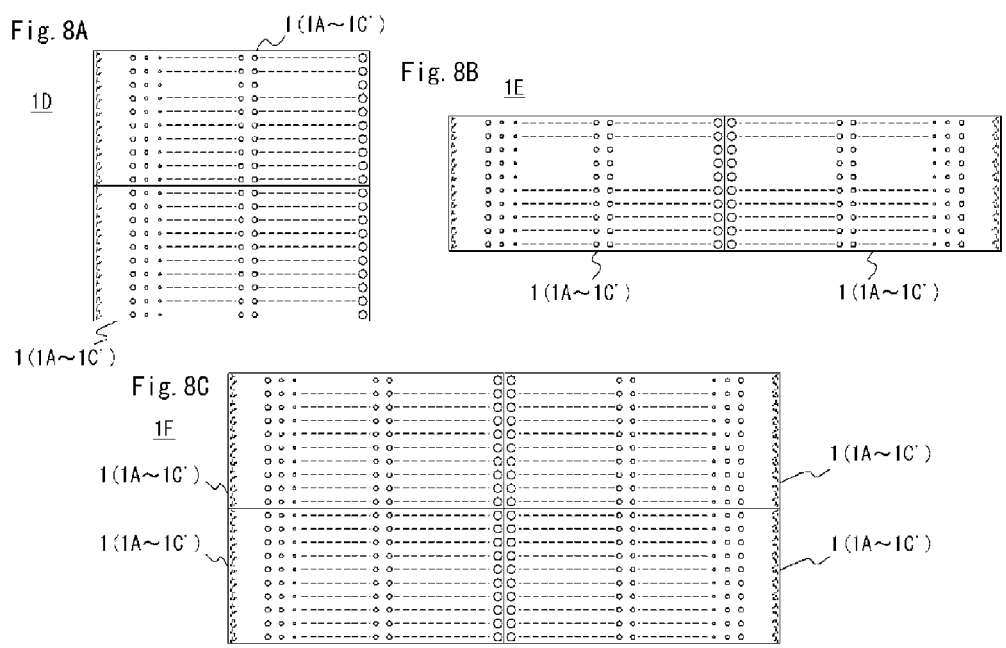
FIG. 8A to FIG. 8C are top views of a large planar light source device having a plurality of planar light source devices coupled to each other.

A plurality of each of the planar light source devices 1 to 1C' can be coupled to form a planar light source device and an illumination apparatus with a large light emission area. FIG. 8 shows an example in which the light emission area is increased by coupling a plurality of one of planar light source devices 1 to 1C'. In a planar light source device 1D in FIG. 8A, two planar light source devices are used and coupled at the long side plate portion. In a planar light source device 1E, they are coupled at the short side plate portion. In a planar light source device 1F, four planar light source devices are coupled. When a plurality of planar light source devices are coupled, the side plate portions at the coupling portion are overlapped. Then, one of the side plate portions may be eliminated, or the side plate portions at the coupling portion may be formed of a separator, in which the main body case is sized in the coupled state. The optical reflection plate may not be provided for each of the individual planar light source devices but may be formed as a single sheet. These planar light source devices 1D to 1F may be used as they are or may be used as an illumination apparatus or a display apparatus with a light diffusion plate (not shown) disposed above the surface of the optical reflection plate.

In the case where the planar light source devices are coupled in the direction of the optical axis of the point light source, they have to be coupled in opposite directions as shown in FIG. 8B because the section of the light blocking region does not glow, and three or more cannot be coupled. Therefore, as shown in FIG. 10A, the section of the light blocking region serves as the coupling portion so that many can be coupled in the direction of the optical axis of the point light source.

FIG. 9A is a perspective view of a planar light source device according to a modification of the invention, and FIG. 9B is a side view of the planar light source device according to the modification of the invention. FIG. 10A is a top view of a large planar light source device having a plurality of planar light source devices coupled to each other according to the modification of the invention, FIG. 10B is a side view of the large planar light source device having a plurality of planar light source devices coupled to each other according to the modification of the invention.

A planar light source device 1G according to a modification of the invention has the optical reflection plate with openings on only one side. The height of a short side plate portion attached to the main body case 4 is half the distance between the optical reflection plates. A short side plate portion having a point light source attached thereto is upright from the optical reflection plate without openings. A short side plate without a point light source attached thereto is upright from the optical reflection plate with openings. The height of a long side plate portion is half the distance between the optical reflection plates by the length of the light blocking region S1 from both ends and is equal to the distance between the optical reflection plates in the inside therefrom. In other words, the light blocking region S1 and the light transmission region S2 are separated from each other, and a fitted portion 8a is provided above the light blocking region S1.

The optical reflection plate without openings has an attachment portion 8b having the same area and same shape as the fitted portion provided at the light blocking distance S from the side plate portion without a point light source attached thereto. In the case where the linear light source devices 1G are coupled continuously in the direction of the optical axis of the point light source, a fitted portion 8a2 provided on the light blocking region S of the planar light source device 1G2 is connected to an attachment portion 8b1 of another planar light source device 1G1. In a similar manner, a fitted portion 8a3 provided on the light blocking region S of a planar light source device 1G3 is connected to an attachment portion 8b2 of the planar light source device 1G2, whereby those planar light source devices can be coupled continuously in the direction of the optical axis of the point light source. A wide range can be illuminated by coupling continuously not only in the direction of the optical axis of the point light source but also in the direction of the short side plate portion.

Figure 11:
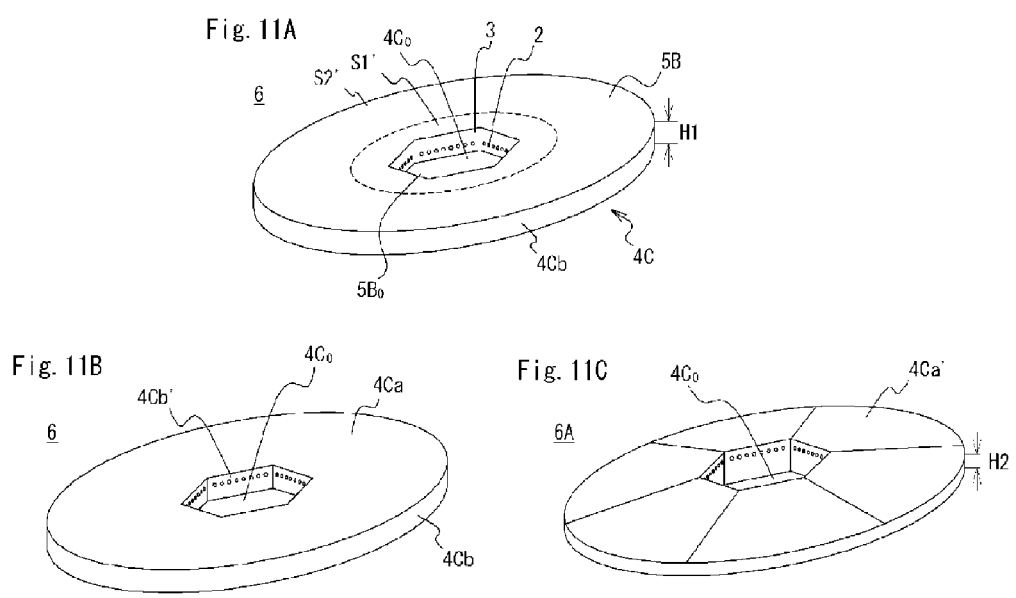
FIG. 11A to FIG. 11C are external perspective views of a planar light source device according to yet another embodiment of the invention.
Figure 15:
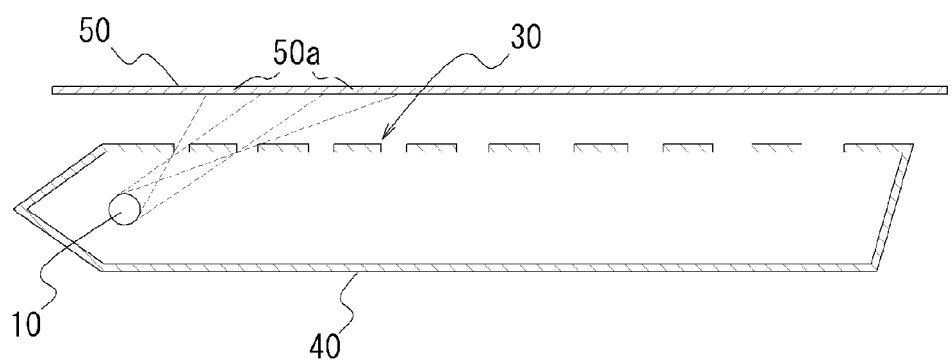
FIG. 15 is a sectional view of a planar light source device of the related art.

In the planar light source device and the illumination apparatus described above, at least one rectangular parallelepiped-shaped device is joined or forms a single unit having the joined size. The shape may be changed to a non-rectangular shape, for example, a doughnut shape having a through hole of a predetermined size at the center of a disk-like body. With reference to FIG. 11 and FIG. 12, a doughnut-shaped planer light source device and illumination apparatus will be described. FIG. 11 shows a planar light source device according to another embodiment of the invention, where FIG. 11A is a schematic perspective view of the doughnut-shaped planar light source device, FIG. 11B is a rear view thereof, and FIG. 11C is a rear view of a modification of the planar light source device in FIG. 11A. FIG. 12 shows the planar light source device in FIG. 11, where FIG. 12A is a top view, and FIG. 12B is a plan view showing an optical reflection plate in FIG. 12A partially enlarged. FIG. 13 shows a modification of the planar light source device in FIG. 11, where FIG. 13A is a top view, and FIG. 13B is a plan view showing an optical reflection plate in FIG. 13A partially enlarged. In FIG. 12A, part of the optical reflection plate and the inside of the main body case are exposed for illustration purposes.

As shown in FIG. 11, FIG. 11B, and FIG. 12, a planar light source device 6 according to another embodiment of the invention is configured to include a main body case 4C provided with a tubular through hole $4C_0$ having a predetermined radius $r_1$ at the center of a disk-like body being shallow and open at an upper surface thereof and having a predetermined radius r, and an optical reflection plate 5B sized to cover the opening of the main body case. The radiuses r and $r_1$ each are the length from a center point O of the through hole.

The main body case 4C has a bottom plate portion 4Ca having a through hole at the center thereof, side plate portions 4Cb and 4Cb' upright by a predetermined height from the through hole and the periphery of the bottom plate portion, respectively, and an opening being open at the top of the side plate portions. The tubular through hole $4C_0$ is formed with the side plate portion 4Cb' upright from the through hole. The main body case 4C may be of any size. In the embodiment shown in FIG. 11A and FIG. 11B, the radiuses r and $r_1$ are 275 mm and 120 mm, respectively, and the depth (height H1) is 15.0 mm. The main body case of a planar light source device 6A according to a modification shown in FIG. 11C has the outer peripheral side lower than the opening side. That is, a bottom plate portion 4Ca' is inclined from the opening side toward the outer peripheral side at a predetermined angle, and the height H2 is smaller than the height H1 of the planar light source device 6.

The main body case 4C has an inner wall surface formed as a reflecting surface. The inside of the main body case 4C is divided equally into a plurality of parts, for example, six parts, and the divided portions are separated from each other by partition plates 7, resulting in six small compartments $4C_1$ to $4C_6$ being open upward. The partition plate serves as a supporting member that supports the optical reflection plate and has both surfaces formed of reflecting surfaces. The supporting member may be formed as a strut having a predetermined height in place of the partition plate. The attachment portion for the strut is not limited, and the strut may be attached at any place. The tubular through hole $4C_0$ has a hexagonal inner wall surface corresponding to the small compartments $4C_1$ to $4C_6$.

The LED substrate 3 is attached to the wall surface so that the light emitting portion of the LED 2 is exposed in each small compartment. The optical reflection plate 5B has a through hole $5B_0$ at a location corresponding to the tubular through hole $4C_0$ of the main body case 4C, and a light blocking region S1' and a light transmission region S2' each having a predetermined area extending outward from the through hole. The opening of the main body case 4C is covered with the optical reflection plate 5B, and optical reflection portions $5B_1$ to $5B_6$ of the optical reflection plate 5B are positioned at the openings of the small compartments $4C_1$ to $4C_6$, respectively. These optical reflection portions $5B_1$ to $5B_6$ are formed by equally partitioning one optical reflection plate 5B into six parts and have the same configuration. One optical reflection portion $5B_1$ will be described with reference to FIG. 12B.

The optical reflection portion $5B_1$ has a light blocking region S1' and a light transmission region S2'. These regions S1' and S2' generally have the same functions as the regions S1 and S2, respectively, of the optical reflection plate 5, except that the area of the light blocking region S1' and the arrangement of through holes in the light transmission regions S2' are different. The light blocking region S1' is formed in a curved strip having a predetermined width and has a larger area than the light blocking region S1 of the optical reflection plate 5 shown by a dotted line in FIG. 12B. It is noted that the optical reflection plate 5 is shown for the sake of comparison. The curved strip is an arc-shaped strip between the radiuses $r_1$ and $r_2$ from the center point O. The light blocking region S1' is also set in a similar manner as the light blocking region S1. The light transmission region S2' has a through hole row disposed on an arc-shaped line with a predetermined radius from the center point O. For example, the first row is the through hole row $5_{11}$ to $5_{m1}$ with a radius $r_2$, and the second row is the rough hole row $5_{12}$ to $5_{m2}$ with a radius $r_3$. The through hole rows are arranged at predetermined intervals at predetermined pitches concentrically about the center point O in the light transmission region S2' of the optical reflection plate 5B.

The planar light source device 6 has the similar advantages as in the planar light source devices 1 to 1B, and can be used as it is or as an illumination apparatus, for example, as a circular lighting fixture with a light diffusion plate provided above the optical reflection plate. In particular, for use as a lighting fixture, it is preferable that light be slightly transmitted through the bottom plate portion 4Ca and the side plate portion 4Cb. This light transmission is accomplished using a thin plate material for the main body case or by providing light transmission means such as semi-through grooves or holes having a predetermined shape at the bottom plate portion and the side plate portion, for example. The light transmission from these portions prevents darkening on the bottom plate portion side and the side plate portion side and thus does not give people uneasy feeling when the planar light source device is suspended as a lighting fixture from the ceiling. When used as a lighting fixture, the planar light source device 6A can be reduced in thickness and improved in its design.

A planar light source device 6C shown in FIG. 13A and FIG. 13B is configured such that the through hole of the planar light source devices 6 and 6A is formed in a cylindrical shape, and accordingly the shape of an optical reflection plate 5B' is changed, and an arc-shaped LED substrate 3' is made into an arc-like shape. This device also has the similar advantages as in the planar light source devices 6 and 6A.

EXPLANATIONS OF LETTERS OR NUMERALS 1, 1A to 1F planar light source device (illumination apparatus) light emitting diode (LED)
3, 3' LED substrate
4, 4A to 4C main body case
$4C_0$ through hole
$4C_1$ to $4C_6$ small compartment
4Ca, 4Ca' bottom plate portion
5, 5A, 5B optical reflection plate
$5B_1$ to $5B_6$ optical reflection portion
$5_{11}$ to $5_{mn}$ through hole
6, 6A to 6C planar light source device (illumination apparatus)
7 partition plate
S1, S1' light blocking region
S2, S2' light transmission region

The invention claimed is:
1. A planar light source device comprising:
a main body case that surrounds the periphery of a gap between a pair of optical reflection plates disposed to face each other with side plates; and
a plurality of point light sources arranged at predetermined intervals on at least one side plate of the main body case,
the planar light source device allowing light from the point light sources to be transmitted through at least one of the pair of optical reflection plates and emitted to an outside,
at least one of the pair of optical reflection plates including a light blocking region that blocks light from the point light sources on the point light sources side, and a light transmission region that does not allow the light from the point light sources to be directly transmitted but allows reflection light reflected between the optical reflection plates to be transmitted, and is aligned so that transmissivity increases as the distance from the light blocking region increases, and luminance is substantially uniform on a surface of the optical reflection plate,
the light blocking region and the light transmission region are separated from each other, and that a first distance from the light blocking region to the optical reflection plate opposed thereto is half of a second distance from the light transmission region to the optical reflection plate opposed to the light transmission region.
2. The planar light source device according to claim 1, wherein the light transmission region is aligned so that luminance is uniform on the surface of the optical transmission region based on light distribution characteristics of the point light sources.
3. The planar light source device according to claim 2, wherein the light transmission region has a plurality of through holes or slits disposed to pass through the optical reflection plate.
4. The planar light source device according to claim 1, wherein the light blocking region is formed in a region wider than the gap between the pair of optical reflection plates.
5. An illumination apparatus comprising:
at least one planar light source device according to claim 1.
6. An illumination apparatus comprising:
at least one planar light source device according to claim 1; and
a light diffusion plate on an illumination surface thereof.
7. A planar light source device comprising:
a main body case having a shallow disk-like body with a predetermined depth;
the disk-like body having:
a bottom with a through-hole at the center of the bottom;
a first wall arranged around the through-hole;
a second wall arranged around the outer peripheral of the bottom,
the first wall and the second wall forming an opening opposed to the bottom,
an optical reflection plate that closes the opening of the main body case; and
a point light source disposed on the first wall,
the planar light source device allowing light from the point light source to be reflected between an inner wall surface of the main body case and the optical reflection plate to be emitted to the outside, and
the optical reflection plate including a light blocking region that blocks the light from the point light source on the point light source side, and a light transmission region that does not allow the light from the point light source to be directly transmitted but allows reflection light reflected between the optical reflection plates to be transmitted, and is aligned so that transmissivity increases as the distance from the light blocking region increases and luminance is substantially uniform on the surface of the optical reflection plate.

8. The planar light source device according to claim 7, wherein the optical reflection plate has the light blocking region around the periphery of the through hole of the main body case and the light transmission region around the periphery of the light blocking region.

9. The planar light source device according to claim 8, wherein the light transmission region is aligned based on light distribution characteristics of the point light source so that luminance is uniform on the surface of the light transmission region.

10. The planar light source device according to claim 9, wherein the light transmission region includes a plurality of through holes or slits passing through the optical reflection plate that are disposed concentrically about the through hole.

* * * * *